United States Patent
Ishizuka et al.

(10) Patent No.: US 8,261,363 B2
(45) Date of Patent: Sep. 4, 2012

(54) MANAGING ELECTRONIC DATA WITH IDENTIFICATION DATA

(75) Inventors: Hiroaki Ishizuka, Ridgewood, NJ (US); Yuichi Takamiya, Fort Lee, NJ (US); Yusuke Tamari, West Caldwell, NJ (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 986 days.

(21) Appl. No.: 12/111,768

(22) Filed: Apr. 29, 2008

(65) Prior Publication Data
US 2009/0271872 A1 Oct. 29, 2009

(51) Int. Cl.
H04L 29/06 (2006.01)
(52) U.S. Cl. ............. 726/28; 726/26; 726/29; 380/232; 705/51
(58) Field of Classification Search .................. 726/26, 726/28, 29; 380/231, 232; 713/182; 707/999.003, 707/999.104; 705/51, 55, 56, 58, 59
See application file for complete search history.

(56) References Cited

U.S. PATENT DOCUMENTS

| | | | |
|---|---|---|---|
| 6,035,308 A | 3/2000 | Yano et al. | |
| 7,016,062 B2 | 3/2006 | Ishizuka | |
| 7,099,490 B1 * | 8/2006 | Fujita et al. | 382/100 |
| 7,117,247 B2 | 10/2006 | Hyakutake et al. | |
| 7,142,690 B2 | 11/2006 | Hyakutake et al. | |
| 7,149,784 B2 | 12/2006 | Kitada et al. | |
| 7,246,158 B2 | 7/2007 | Kitada et al. | |
| 2004/0215671 A1 | 10/2004 | Hyakutake et al. | |
| 2005/0240518 A1 | 10/2005 | Ishizuka | |
| 2005/0246272 A1 | 11/2005 | Kitada et al. | |
| 2006/0168075 A1 | 7/2006 | Kitada et al. | |
| 2006/0168148 A1 | 7/2006 | Hyakutake et al. | |
| 2006/0259566 A1 | 11/2006 | Hyakutake et al. | |
| 2006/0269099 A1 | 11/2006 | Hyakutake et al. | |
| 2007/0030999 A1 | 2/2007 | Hyakutake et al. | |
| 2007/0050360 A1 * | 3/2007 | Hull et al. | 707/6 |
| 2007/0133051 A1 | 6/2007 | Hyakutake et al. | |
| 2007/0150534 A1 | 6/2007 | Hyakutake et al. | |
| 2007/0156726 A1 * | 7/2007 | Levy | 707/100 |
| 2007/0240029 A1 | 10/2007 | Kitada et al. | |
| 2008/0080017 A1 | 4/2008 | Ishizuka et al. | |

* cited by examiner

Primary Examiner — Justin T Darrow
(74) Attorney, Agent, or Firm — Cooper & Dunham LLP

(57) ABSTRACT

An improved approach for managing and sending electronic data which allows one to access electronic data corresponding to a hardcopy document is provided. For example, when the hardcopy bearing a visible image is output, an identification image corresponding to identification data identifying the document is added to the visible image. The identification data can be recognized from the identification image, and used to retrieve various information in a database corresponding to the document.

17 Claims, 12 Drawing Sheets

| URL | File Name | ID | File Extension | Receiver E-mail Address | Authorized Distrib. | Other Attachments (URL) |
|---|---|---|---|---|---|---|
| https://www.xxxx.com/directlink.asp?login val=1&account=XXXXX&clear=1&id=090515f480360a17 | Minutes07.doc | 090515f480360a17 | doc | tamari@xxx.com | tamari | https://www.xxxx.com/directlink.asp?login val=1&account=XXXXX&clear=1&id=090515f48026cf8c<br><br>https://www.xxxx.com/directlink.asp?login val=1&account=XXXXX&clear=1&id=090515f4802cb98a<br><br>https://www.xxxx.com/directlink.asp?login val=1&account=XXXXX&clear=1&id=090515f4802bc035 |
| https://www.xxxx.com/directlink.asp?login val=1&account=XXXXX&clear=1&id=090515f480268518 | Movie_top.jpg | 090515f480268518 | jpg | tamari@xxx.com<br>takamiya@zzz.com<br>ishizuka@yyy.com | tamari<br>takamiya<br>ishizuka | https://www.xxxx.com/directlink.asp?login val=1&account=XXXXX&clear=1&id=090515f4802c546f |

Fig. 6

| Logon Name | E-mail Address | Password |
|---|---|---|
| tamari | tamari@xxx.com | 832hZea22 |
| ishizuka | ishizuka@yyy.com | jfoAEhoe23 |
| takamiya | takamiya@zzz.com | YEWel2Le |

☐ tamari@xxx.com    ☐ Attachment

☒ ishizuka@yyy.com   ☐ URL

☒ takamiya@zzz.com

Send

Fig. 15a

☐ tamari@xxx.com    ☐ Attachment   ☐ URL

☒ ishizuka@yyy.com   ☒ Attachment   ☐ URL

☒ takamiya@zzz.com   ☐ Attachment   ☒ URL

Send

Fig. 15b

MANAGING ELECTRONIC DATA WITH IDENTIFICATION DATA

TECHNICAL FIELD

This disclosure relates to systems, apparatuses and methodologies for managing electronic data, and in particular, an approach wherein an identification image identifying specific electronic data is added to a visible image corresponding to the specific electronic data is printed.

BACKGROUND

In the current information age, it has often been discussed that proliferation of information technology can lead to a paperless society. However, in practice, many people still rely on hardcopy documents for assorted reasons.

For example, there are many instances in which the preparation of a document involves input from multiple individuals simultaneously. In such circumstances, while an electronic working document (for example, generated using application software such as Word, Excel, PowerPoint, Notepad, Photo-Editor, Photoshop, etc.) can be circulated by electronic mail to multiple recipients, the working documents may additionally be distributed in hardcopy form, or a recipient may print the electronic document. In any event, hand-annotation can be applied on the hardcopy, to propose changes thereto and/or to indicate other comments. Such approach (that is, hand-annotating comments on a hardcopy) is still preferred by many. Accordingly, electronic document and corresponding hardcopy continue to co-exist in an office environment in many (and perhaps, most) instances.

In order to update the working document in accordance with the hand-annotated comments, it is typically necessary to identify the version and location of the working document, especially when there are multiple versions of the document. Although some software applications allow the user to specify that a document indicator (such as file name, date and time of creation or last modification, etc.) is to be automatically placed on the document output (for example, hardcopy), such indicators alone may not uniquely identify a location of the document data corresponding to the hardcopy, particularly when multiple versions of the document exist and/or are not in a centralized repository.

In addition, in some instances, a uniform resource locator (URL) is provided to identify a location of such content. However, a URL can consist of a long string of characters and/or symbols, and it can be a burden to a user to reproduce the URL read from the hardcopy, since even a single typographical error when specifying or typing the URL will thwart access to the desired content.

There remains a need for an improved tool that allows a user to readily reference, search for, and/or obtain electronic data corresponding to a hardcopy document.

SUMMARY

The disclosure provides tools (in the form of systems, apparatuses and methodologies) for managing and sending electronic data which allow one to access document (and/or other) data, if available, corresponding to a hardcopy document or other content (such as video, audio, still image, graphics, multi-media files, etc.).

In an aspect of the present disclosure, identification data (for example, a string of numbers and/or characters) corresponding to specific document data or other content is stored in an identification data storage part. The identification data identifies the corresponding document or other content, and thus each document or content can have its own unique identification.

In another aspect of the present disclosure, when a visible image of a document is output (for example, by a printing device), an identification image (for example, a bar code) is added to the visible image based on identification data corresponding to the document or content. The identification data can be recognized from the identification image, and can be used to access and retrieve information in the information management database corresponding to the document or content, to be sent to an authorized destination to allow the destination to access the data for the specific document or content. Various information can be stored in the information management database for each document or content.

For example, electronic data stored in the information management database for a specific document or content can include, in addition to the above-mentioned identification data, a uniform resource locator (URL) indicating a location of data for the specific document or content, information indicating data type (or format) of the data, receiver address information identifying destinations to which the specific data identified by the identification data is authorized to be sent, distribution authorization data identifying users having authorization to distribute the specific data identified by the identification data, URL or other indication of additional attachments associated with the specific data, etc.

The data management tools of this disclosure may be a computer program product stored in or on a program storage medium (such as optical disks, magneto-optical disks, floppy diskettes, ROMs, RAMs, EPROMs, EEPROMs, FLASH memory, any type of media suitable for storing electronic instructions, etc.) readable by a computer and tangibly embodying a program of instructions executable by the computer.

BRIEF DESCRIPTION OF THE DRAWINGS

The features of the present disclosure can be more readily understood from the following detailed description with reference to the accompanying drawings wherein:

FIG. 6 shows a view of an example of an information management table;

FIGS. 15a and 15b show respective examples of user interfaces for selecting destinations and selecting electronic data to be sent;

DETAILED DESCRIPTION

Figure 1:
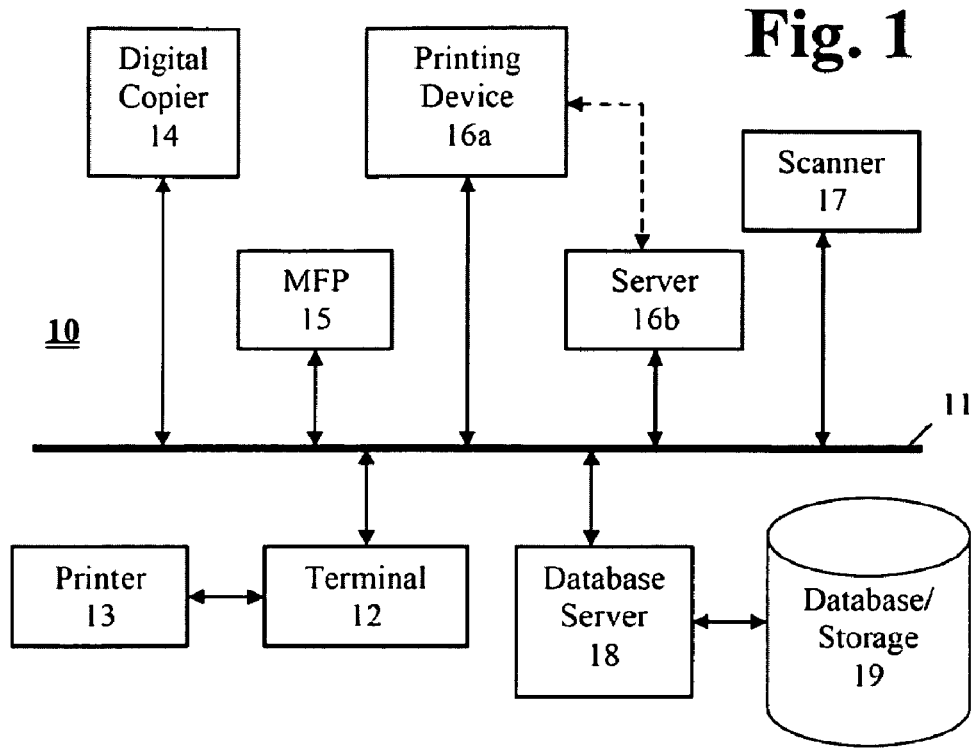
FIG. 1 shows a block diagram of a system, according to an exemplary embodiment of the present disclosure.

In describing examples and exemplary embodiments illustrated in the drawings, specific terminology is employed for the sake of clarity. However, this disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, FIG. 1 shows a block diagram of a system for managing electronic data, in an example of the present disclosure. System 10 includes network 11, user terminal 12, printer 13, digital copier 14, multi-function device (MFD) 15, other printing device 16a, print server 16b, scanner 17, database server 18 and database or data storage 19.

As shown in FIG. 1, the system 10 can include plural printing devices which are connected to the network (such as digital copier 14, MFD 15, etc.) or connected to a terminal (for example printer 13 connected to user terminal 12) or a server (for example, printing device 16a connected to print server 16b). The terms "printer" and "printing device" are used hereinafter generically to include any output device having a printing or plotting functionality, and include multi-function devices having a copy and/or scanning functionality in addition to the printing or plotting functionality.

Each printing device typically has a print engine and a communication interface that are otherwise conventional, and therefore, a detailed description of such conventional aspects are omitted in the interest of clarity and brevity (so as not to mask the novel aspects of the subject matter of this disclosure). Any terminal connected to the network 11 can (assuming an appropriate print driver or print application is accessible from the terminal) print to any of the printing devices. On the other hand, access to the printing devices and/or capabilities thereof can be controlled through access right management. For example, the volume of printing by a specific user on a specific printing device, or on the collection of printing devices, may be limited.

On the other hand, features and/or information in the printout generated by the printing device are generally controlled by software, firmware and/or commands (for example, in a print job) received from a user terminal (remotely through the network 11) or user interface (local). Such capability likewise are conventional unless otherwise discussed below.

In addition, several components of the system 10, such as digital copier 14, MFD 15 and scanner 17, have scanning functionality. The scanning functionality can include document scanning functionality (that is, scanning document and outputting document image data) and optionally bar code reading functionality. Such document scanning and bar code scanning functionalities are conventional, unless otherwise discussed herein, and a detailed description of such conventional aspects are omitted in the interest of clarity and brevity.

Figure 2:
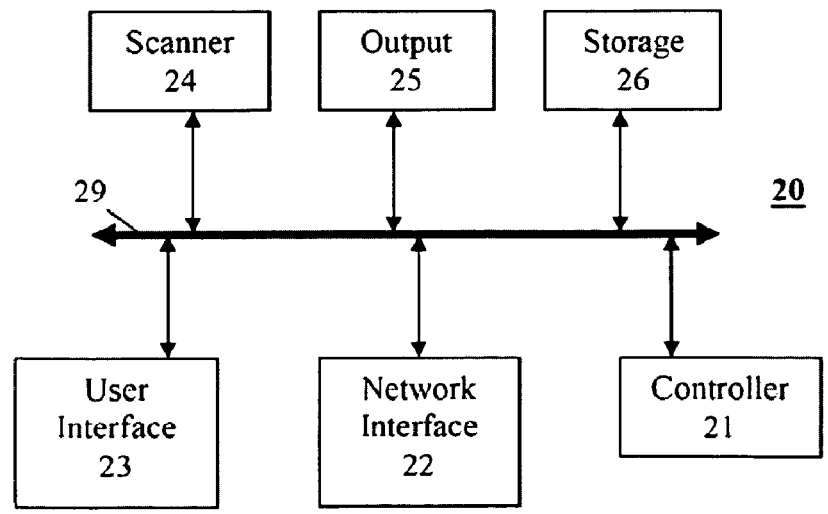
FIG. 2 shows a block diagram of a multi-function apparatus, according to an exemplary embodiment of the present disclosure.

A multi-function device (MFD) which includes scanning and printing functions (and additionally can serve as a user terminal for entering, saving and accessing electronic data) will be discussed below with reference to FIG. 2.

MFD 20 includes a controller 21 and various elements connected to the controller 21 by an internal bus 29. The controller 21 controls and monitors operations of the MFD 20. The elements connected to the controller 21 include network interface 22, user interface 23, scanner engine 24, output part or print engine 25, and memory/storage 26.

Memory/storage 26 can include, for example, random access memory, read-only memory, hard disk drive, portable storage media drive such as for optical discs, magnetic discs, magneto-optical discs, etc., semiconductor memory cards, combinations of storage media, etc.

Program code instructions for the MFD 20 can be stored in memory/storage 26 and executed by the controller 21 to carry out the instructions. Such instructions can include instructions in connection with performing specified functions (such as print and scan processing), to enable the MFD to interact with the user terminals and the database server 18 (as well as perhaps other external devices) through the network interface 22, and to control interactions with users through the user interface 23.

The user interface 23 includes one or more display screens that display information allowing the user of the MFD to interact with the MFD. The display screen can be any of various conventional displays (such as a liquid crystal display, a plasma display device, a cathode ray tube display, etc.), but is preferably equipped with a touch sensitive display (for example, liquid crystal display), and configured to provide a GUI (graphical user interface) based on information input by an operator of the MFD, so as to allow the operator to conveniently take advantage of the services provided by the system. The display screen does not need to be integral with, or embedded in, a housing of the MFD, but may simply be coupled to the MFD by either a wire or a wireless connection. The user interface 23 may include keys and/or buttons (such as graphical keys or buttons, or other graphical elements, of a GUI on a touchscreen display) for inputting information or requesting various operations. Alternatively, the user interface 23 and the display screen may be operated by a keyboard, a mouse, a remote control, voice recognition, or eye-movement tracking, or a combination thereof.

In a preferred embodiment, the user interface 23 provides a graphical user interface (GUI) so as to allow an operator of the MFD to interact conveniently with services provided on the MFD, or with the MFD serving as terminal for accessing electronic data or other content through the network 11. For example, a browser (such as Internet Explorer™, Netscape Navigator™, a proprietary browser, etc.) may be provided on the MFD so that the operator can use browsing operations to access the database or storage 19 through the database server 18 in system 10. In addition, the operator can use the browser to access and print a document or other electronic data from storage 19 or another content source. As another example, the operator can scan a document, and use the browser to upload the image data from scanning of the document to the storage 19 (and specify additional information associated with the image). In addition, the operator can use the browser to specify attachments to be associated with the saved document. Additional user interface features are described infra.

The MFD can have any or all of the functions of similar devices conventionally known, such as for sending and receiving e-mails with attachments, editing images, accessing FTP files, surfing the Web, sending a fax, etc.

Printer engine 25, scanner engine 24, network interface 22 and print server 16b are conventional (unless indicated otherwise herein), and therefore, a detailed description of such conventional aspects are omitted in the interest of clarity and brevity.

The network 11 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 11. In addition, the network 11 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

The user terminal 12 can be any computing device, including but not limited to a personal, notebook or workstation computer, a kiosk, a PDA (personal digital assistant), a mobile phone or handset, another information terminal, etc., that can communicate with the printer 13 and/or through the network 11 with other printing devices. Although only one user terminal is shown in FIG. 1, it should be understood that the system 10 can include a plurality of user terminal devices (which can have similar or different configurations).

Figure 3:
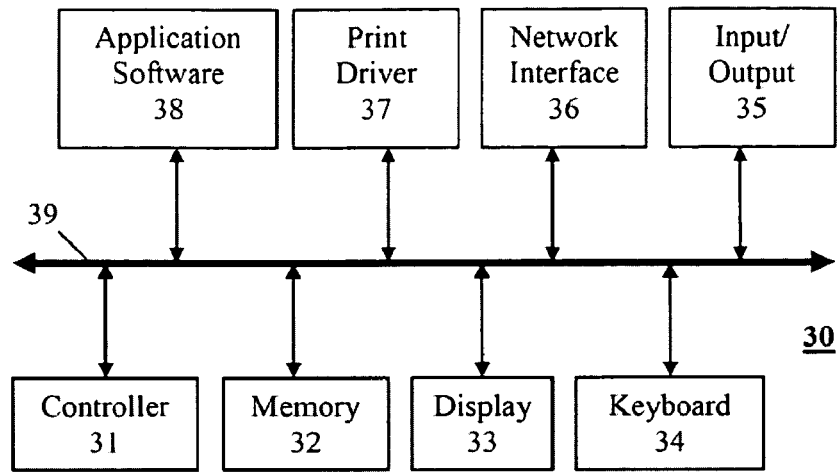
FIG. 3 shows a block diagram of an example of a terminal shown in FIG. 1.

An example of a configuration of the user terminal (for example, as a computer) is shown schematically in FIG. 3. In FIG. 3, computer 30 includes a controller (or central processing unit) 31 that communicates with a number of other components, including memory 32, display 33, keyboard (and/or keypad) 34, other input/output (such as mouse, touchpad, stylus, microphone and/or speaker with voice/speech interface and/or recognition software, etc.) 35, network interface 36, print driver 37 and application software 38, by way of a internal bus 39.

The memory 32 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 36 provides a connection (for example, by way of an Ethernet connection or other network connection which supports any desired network protocol such as, but not limited to TCP/IP, IPX, IPX/SPX, or Net-BEUI) to network 11.

Print driver 37 and application software 38 are shown as components connected to the internal bus 39, but in practice are typically stored in storage media such as a hard disk or portable media, and/or received through the network 11, and loaded into memory 32 as the need arises.

The computer/terminal 30 may be configured (such as through the print driver 37 or application 38) to have a plurality of print modes, such as PDL mode, image mode, etc. In the PDL mode, the terminal communicates a print job to the printing device by utilizing a page description language (PDL) (for example, PostScript, etc.) and including one or more commands (for example, PCL, PJL, etc.), in a format which can be processed by the printing device. In image mode, the information terminal converts the print job into bitmap data and transmits the bitmap data to the printer device. In any event, the print job is communicated from the terminal via one or more packets through the network. Each packet includes in its header the network address (for example, IP address, Mac address, etc.) of the sending terminal.

When a document is printed (that is, a visible image corresponding to the document is applied to recording medium, such as paper) in the system 10 of FIG. 1, a document identification image, such as a barcode or another symbolic or graphical representation, corresponding to identification data uniquely assigned within the system to such document is preferably added to the visible image. As discussed further infra, the identification data is stored along with location information indicating a location in storage wherein electronic data corresponding to the document is saved to an identification data storage part of an information management database maintained by the database server 18, and can be used as an index to obtain such information from the information management database.

The functionality for adding the identification image may be embodied in the print driver, the application software and/or a printing device. For example, the print driver or application may be configured with one or more parts for obtaining the identification data and communicating the identification data to the printing device, and the printing device may be configured to generate the identification image based on the identification data from the print driver or application. In another example, the print driver or application obtains the identification data, generates the identification image and transmits the identification image along with the visible image to the printing device, with or without having added the identification image in the visible image.

Additional aspects or components of the computer 30 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
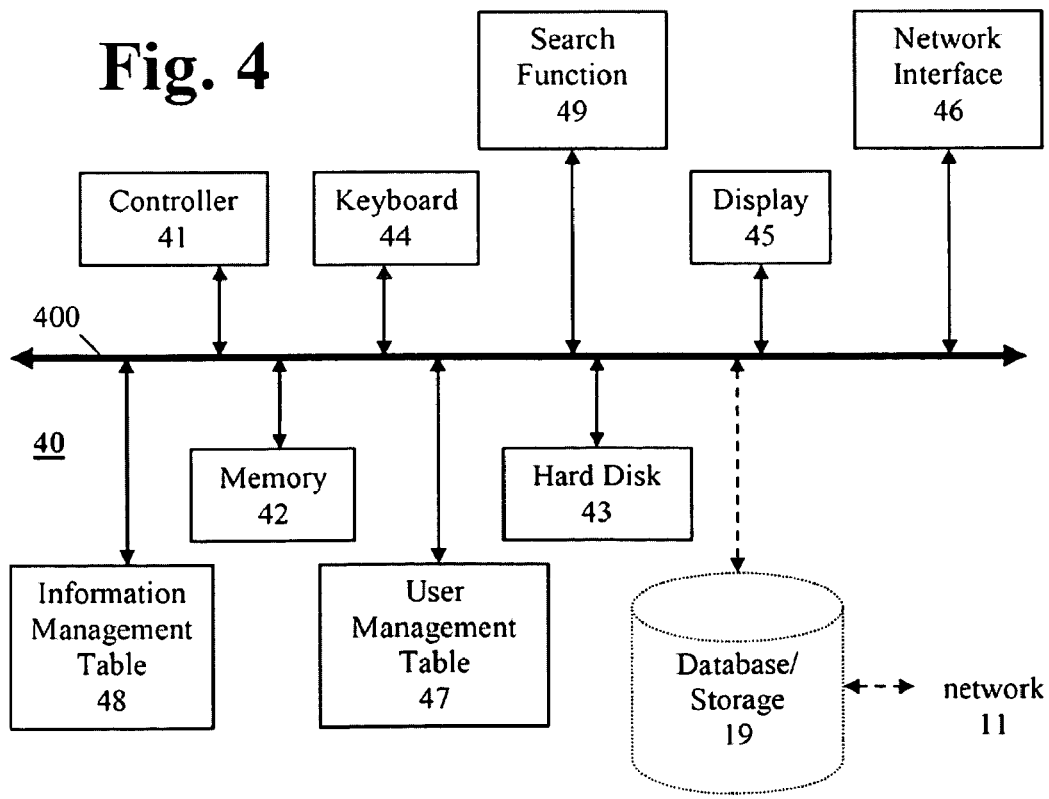
FIG. 4 shows a block diagram of a database server, in an example of the present disclosure.
Figure 5:
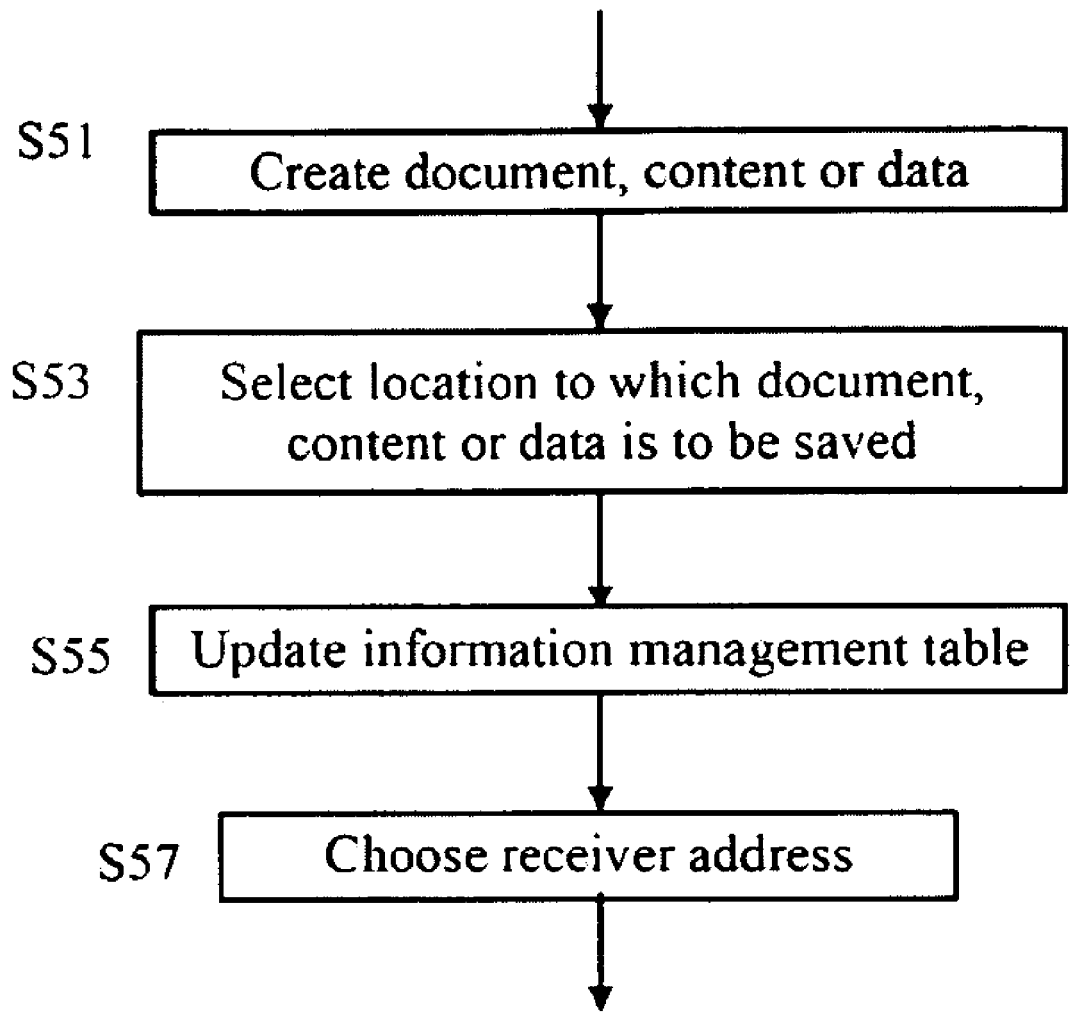
FIG. 5 shows a flow chart for a method for managing document, data or other content to be saved, in an exemplary embodiment of the present disclosure.

FIG. 4 shows an exemplary constitution of a database server. In FIG. 4, server 40 includes a controller (or central processing unit) 41 that communicates with a number of other components, including memory 42, hard disk 43, keyboard 44, display 45, network interface 46, user management table 47, information management table 48 and search function 49, by way of a system bus 400.

The database server may be a special-purpose device (such as including one or more application specific integrated circuits or an appropriate network of conventional component circuits) or it may be software-configured on a conventional personal computer or computer workstation with sufficient memory and processing capabilities, as will be appreciated to those skilled in the relevant arts. Further, if adequate storage, processing and communication capabilities are included, the computing device can double as a database server and as a print server (which in many respects can be configured similarly).

In server 40, controller 41, memory 42, hard disk 43, keyboard 44, display 45, network interface 46 and search function 49 are conventional, and therefore in order to avoid masking the inventive aspects of this disclosure, such conventional aspects will not be discussed in detail herein.

The controller 41 executing program code instructions controls server operations, including maintaining user management table 47 and information management table 48 to store various information and data and provide various services to authenticated users.

The information and data maintained by the server 40 may be retrieved on demand by a user (or a manager, an administrator, etc.) who is properly authenticated. For example, an information request from a user may entail specifying a URL (uniform resource locator) or other identification uniquely identifying document or other content for which data is stored in the database 19. Such identification information along with user information (identifying the user requesting the information) are processed to authenticate the user as having authorization to access the information, and then, if the user has access rights to the requested information, send the requested information or data to a specified destination, for example, allow the user to retrieve or download the information, e-mail the requested information to a destination e-mail address (such as specified by the user or associated with the user as indicated in the database), print the requested information at a specified printing device, etc.

The requested information or data is not limited to documents (for example, application files, document images, etc.) but rather can be virtually any type of content, for example, video and/or audio, multi-media files, etc.

As shown in FIG. 4, the database server 40 includes a network interface 46 for communications through a network, such as communications through the network 11 with the MFP 15 or terminal 12 in FIG. 1. The terminal 12 or MFP 15 can interact (exchange data) with the server via the network 11, so as to benefit from a number of services provided by the server. For example, a request to search for and retrieve a document (or other content) or a request to store a document scanned by a scanner device (in, for example, digital copier 14, MFP 15, scanner 17, etc.) can be sent from the terminal 12 or MFP 15 to the server. As another example, the terminal 12 or MFP 15 can transmit to the server a document, file, data, etc., to be deposited in the database, and other information may be communicated as well, such as, for example, user identification, password, the name of the person sending the document, the name of the author of the document, the date and time of the scanning, the version of the document, the serial number and/or location of the image capture device, etc.

The database server 40 is configured to receive electronic data (for example, corresponding to a scanned document) through the network interface 46 from a network-connected device (for example, terminal 12, MFD 15, another scanning device, etc.), and process the received document, file, data, other content, etc., including uploading the received document, file, data, other content, etc., to the store or database 19.

Additional services that can be provided by the server 40 are described in commonly-owned U.S. Pat. Nos. 7,401,125, 7,142,690, 7,734,715, 7,246,158, 7,149,784, 7,117,247, 7,720,758, and 7,194,433, the entire contents of each of which are incorporated herein by reference.

Some methods which can be used with the system of FIG. 1, for example, are described below.

For example, a method for managing new or modified documents, data or other content to be saved is discussed below with reference to FIGS. 4 through 7.

Document, data and/or other content can be generated and/or modified through use of any software application (for example, MS Word, Excel, PowerPoint, Notepad, PhotoEditor, PhotoShop, etc.) (step S51). The user typically uses the application, or a browsing function provided by the system, to select a destination (such as a user-selected folder) to save the document, data and/or other content in the database or storage 19 (step S53). The server (FIG. 4) automatically creates a unique identification for the document, data and/or other content, uses the identification in creating a URL (uniform resource locator) for the document, data and/or other content, and updates the information management table 48 to reflect the file name, identification and URL of the document, data and/or other content, in the database 19 (step S55). The user can specify destination e-mail addresses ("Receiver E-mail Address") to which the document, data and/or other content can be transmitted (step S57). For example, a destination e-mail address can be manually input. On the other hand, it is preferable to present the user with a list of candidate addresses, such as retrieved from the user management table (see, for example, FIG. 7), from which the user can select a destination e-mail address, without manually typing the address.

As mentioned supra, multiple documents, data and/or content can have the same file name. The respective unique identifications, however, can be utilized to distinguish multiple documents, data and/or content having the same file name. The URL (with identification embedded therein) can be used to identify a location of a specific document, data and/or content, and can be used in a communication such that a recipient of the communication can request to access the document, data and/or content utilizing the URL. On the other hand, the communication can also (or alternatively) include the file name of the specific document, data and/or content, so that the recipient can readily grasp, from the file name, the nature of the document, data and/or content.

In addition, other information can be added to the information management table 48 as well. For example, file extension information may be added, and subsequently used to readily identify a type of the document, data or content and/or select an appropriate icon for the document, data or content.

Figures 7, 8:
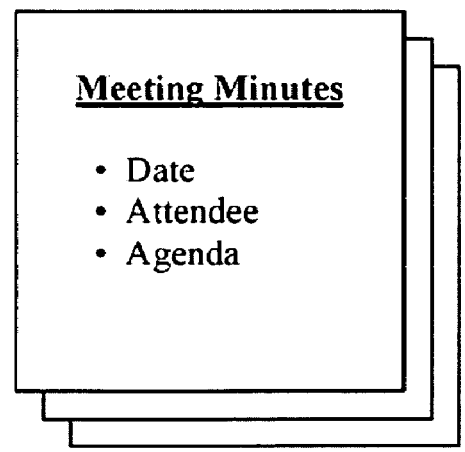
FIG. 7 shows a view of an example of a user management table.
FIG. 8 shows a graphical representation of an example of a document.

Further, the document, data and/or content can include multiple parts. FIG. 8 shows an example of such a document, that is, meeting minutes. The cover page of the meeting minutes provides a summary (such as date, attendee and agenda of the meeting). Such information is not confidential and can be accessible to anyone without limit. On the other hand, the subsequent pages may contain confidential detailed meeting minutes with diagrams, photos, graphs, etc., used in the meeting. Such confidential information can be posted in the database as one or more attachments to, but separate from, the cover page. Thus, anyone using the URL in the information management table can access the cover page. One or more additional URLs corresponding to the attachments are also stored in the information management table. When a user uses the URLs corresponding to the attachments to request access to the attachments, the user can be prompted for authentication information and access can be contingent on authentication of the user as someone having authorization to access such confidential information.

As another example, the URL registered in the information management table may indicate the location of a publicly available poster, still image (see File Name "Movie_top.jpg") or trailer for a movie or video, and the movie or video is an attachment that a user can request by using the Attachment URL. Access to the movie or video may be contingent on authentication, with or without electronic payment.

After the document, data and/or other content is saved (and the information management table is updated), a user may request to print or distribute such document, data and/or other content, and/or print or distribute associated content.

A method for managing electronic data to be printed, in another example of this disclosure, will now be described with reference to FIG. 9.

Figure 9:
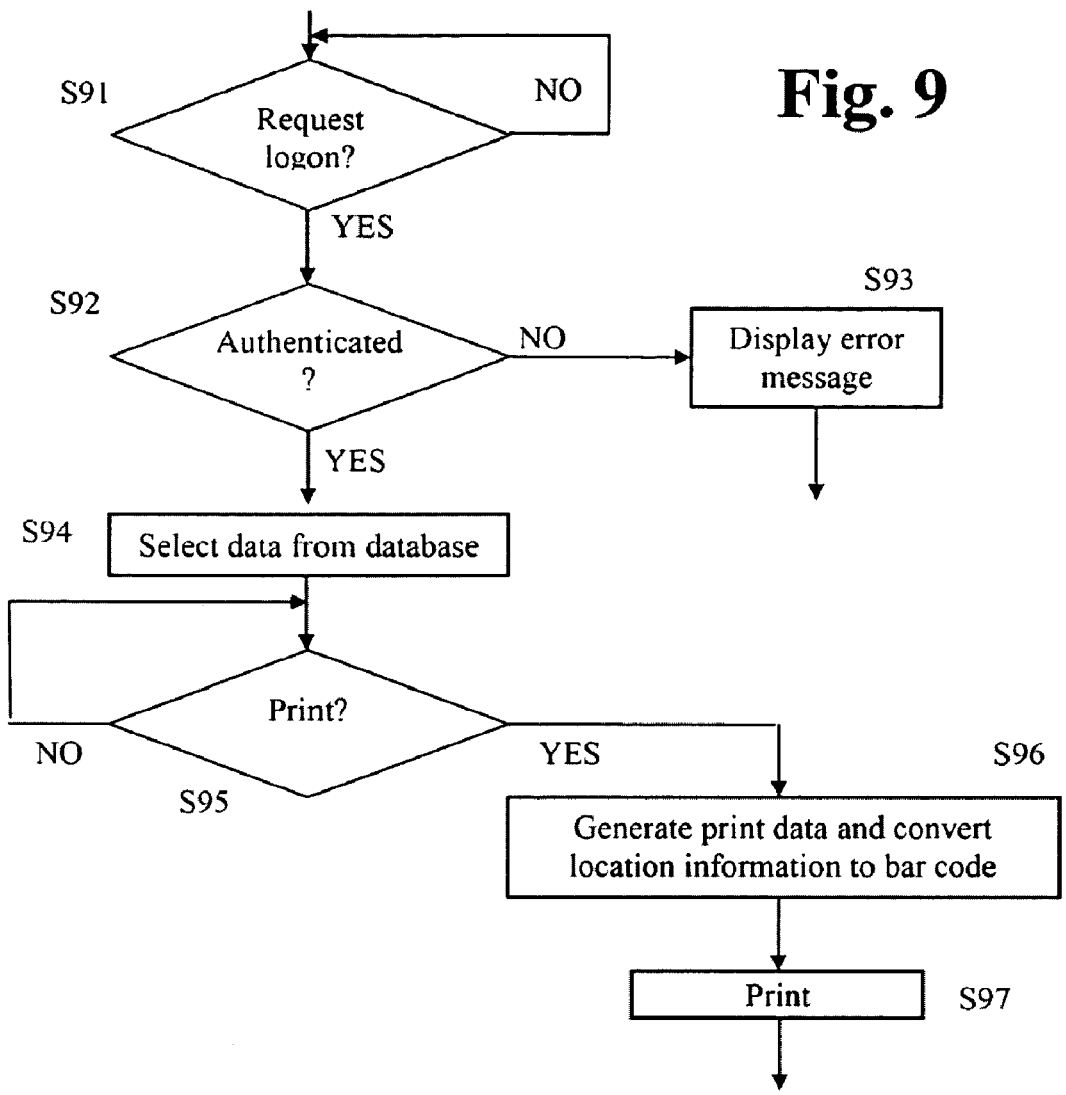
FIG. 9 shows a flow chart for a method for managing electronic data to be distributed, in another example of the present disclosure.

In the example of FIG. 9, as a pre-condition to access to information in the database/storage part 19 and/or in the information management table, the user will need to be authenticated. As an initial step of the method, it is checked whether the user has logged in (step S91), either on the local terminal or to the system serviced by, for example, the server (FIG. 4). If the user has logged in (step S91, YES), the log-in information is used to authenticate the user (step S92), for example, by comparing to the information in the user management table (FIG. 7).

Although the user management table in the example of FIG. 7 stores logon name and password information, and such information can be used for user authentication, other techniques for authenticating the user can be used as well. For example, user authentication can entail the user swiping an access card through a card reader, with such access card including user identification information, to enable the management server to identify and authenticate the user. As another example, one or more biometrics means (such as comparing fingerprints, palm prints, voice or speech, retinas or irises, facial expressions or features, signature, etc.) may be used.

In any event, if the user is not authenticated (step S92, NO), an error message is displayed at the user end (step S93) and/or the user is requested to re-enter log-in information (not shown). On the other hand, if the user is authenticated (step S92, YES), the user is allowed to select document, data and/or other content to be accessed in the database or storage 19 (FIG. 1). If the user requests printing of the selected data (step S95, YES), the URL or identification of the selected data is converted to a barcode (using any of the conventional techniques known in the art), and the bar code image is added to the printing data (for example, bitmap data, image data of a format suitable for printing by the print engine of the printing device, etc.) (step S96), and then the data is printed, with the barcode image appearing on the printout (step S97).

Figure 10:
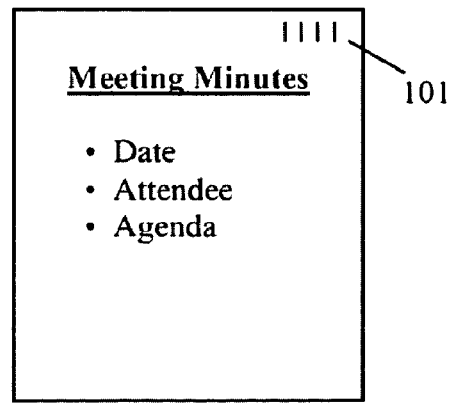
FIG. 10 shows an example of selective output of a visible image corresponding to a specific document.

For example, the cover page of the meeting minutes in the example of FIG. 7 did not include a barcode thereon, and when printed after the method of FIG. 9 is applied, the printout includes a barcode image 101 (FIG. 10).

Before or after the cover page is printed, the user may be notified regarding the availability of attachments, if it is determined based on authentication information that the user is authorized to access the attachments.

A method for managing electronic data to be distributed, in another example of this disclosure, will now be described with reference to FIG. 11.

As with the example of FIG. 9, an authentication process is performed (steps S101 through S103). If the user is authenticated (step S102, YES), the user is permitted to send data, such as image data from scanning of a hardcopy, to the server (for example, FIG. 4) (step S104). The server processes the received image data to determine whether a barcode image can be recognized (step S105), utilizing conventional barcode recognition techniques. If no barcode image is recognized (step S106, NO), an error message, or a message indicating that no barcode was recognized in the received image data, is displayed at the user end (step S107) and/or the user is requested to re-scan the document (not shown).

On the other hand, if a barcode was recognized (step S106, YES), the barcode information is converted to an identification or URL and the identification/URL is compared to the information in the information management database to determine whether there is a match and identify the matched document (step S108). If no match is found (step S109, NO), an error message, or a message indicating that no data corresponding to the received document was found in the system, is displayed at the user end (step S110) and/or the user is requested to re-scan the document (not shown).

If a match is found (step S109, YES), it is determined whether the user is authorized to distribute the document electronically (step S111). If the user is not authorized to distribute the document electronically (step S111, NO), an error message, or a message indicating that the user is not authorized to distribute the document electronically, is displayed at the user end (step S110).

If the user is authorized to distribute the document electronically (step S111, YES), the user is allowed to send an e-mail to the user's e-mail address (determined, for example, by referencing the user management table, see, for example, FIG. 7) and/or to one or more of the authorized destinations ("Receiver E-mail Address" in FIG. 6).

Figure 12:
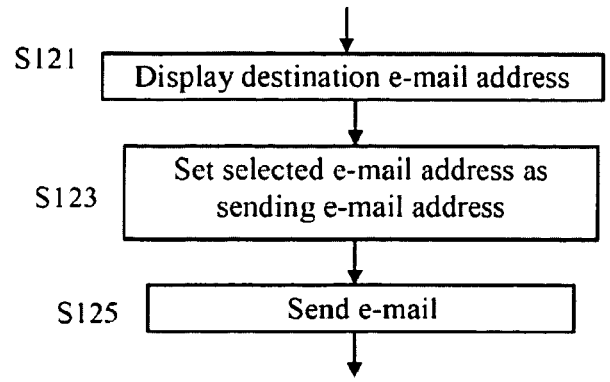
FIG. 12 shows a flow chart for a method for selectively sending electronic data, in an exemplary embodiment of the present disclosure.

A method for managing electronic data to allow selection of a destination to which data is to be distributed, in another example of this disclosure, will now be described with reference to FIGS. 12 and 13.

Figure 13:
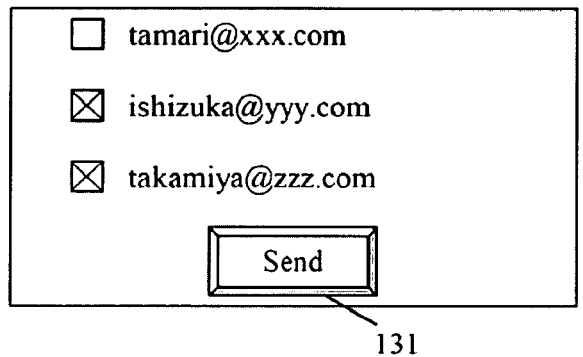
FIG. 13 illustrates an exemplary user interface for selecting destinations to which specified electronic data is to be sent.

In order to facilitate selection of destinations to which data is to be sent, a list of candidate destinations, corresponding to "Receiver E-mail Address" data in FIG. 6, can be displayed at the user end (step S121), such as shown in FIG. 13. The user can select one or more of the candidate destinations (step S123), and the selection is shown in FIG. 13 by the "X" in the checkbox. When the user presses the Send button 131, the document is sent to the selected destinations (step S135).

Figure 14:
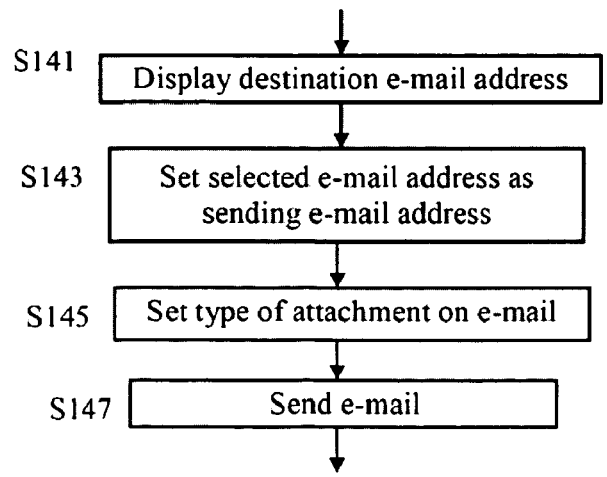
FIG. 14 shows a flow chart for a method for selectively sending electronic data, in another exemplary embodiment of the present disclosure.

In another example (FIG. 14), in addition to displaying the list of candidate destinations (step S141) and allowing the user to select one or more of the candidate destinations (step S143), the user can be allowed to specify a type of attachment information to be include in the e-mail (step S145), and the e-mail is sent upon the user pressing the Send button (step S147), in accordance with the attachment settings, if any.

For example, the user may be permitted to specify that the attachment(s) of the matched entry in the information management table are to be attached to the e-mail to be transmitted to each of the selected destination, or specify that the e-mail will include the URL corresponding to the attachment, as shown in FIG. 15a. As another example, such settings may be made for each individual selected destination. Thus, as shown in FIG. 15b, the attachment may be attached to the e-mail to one selected destination, while the e-mail to another selected destination merely includes a URL to the attachment.

Figure 11:
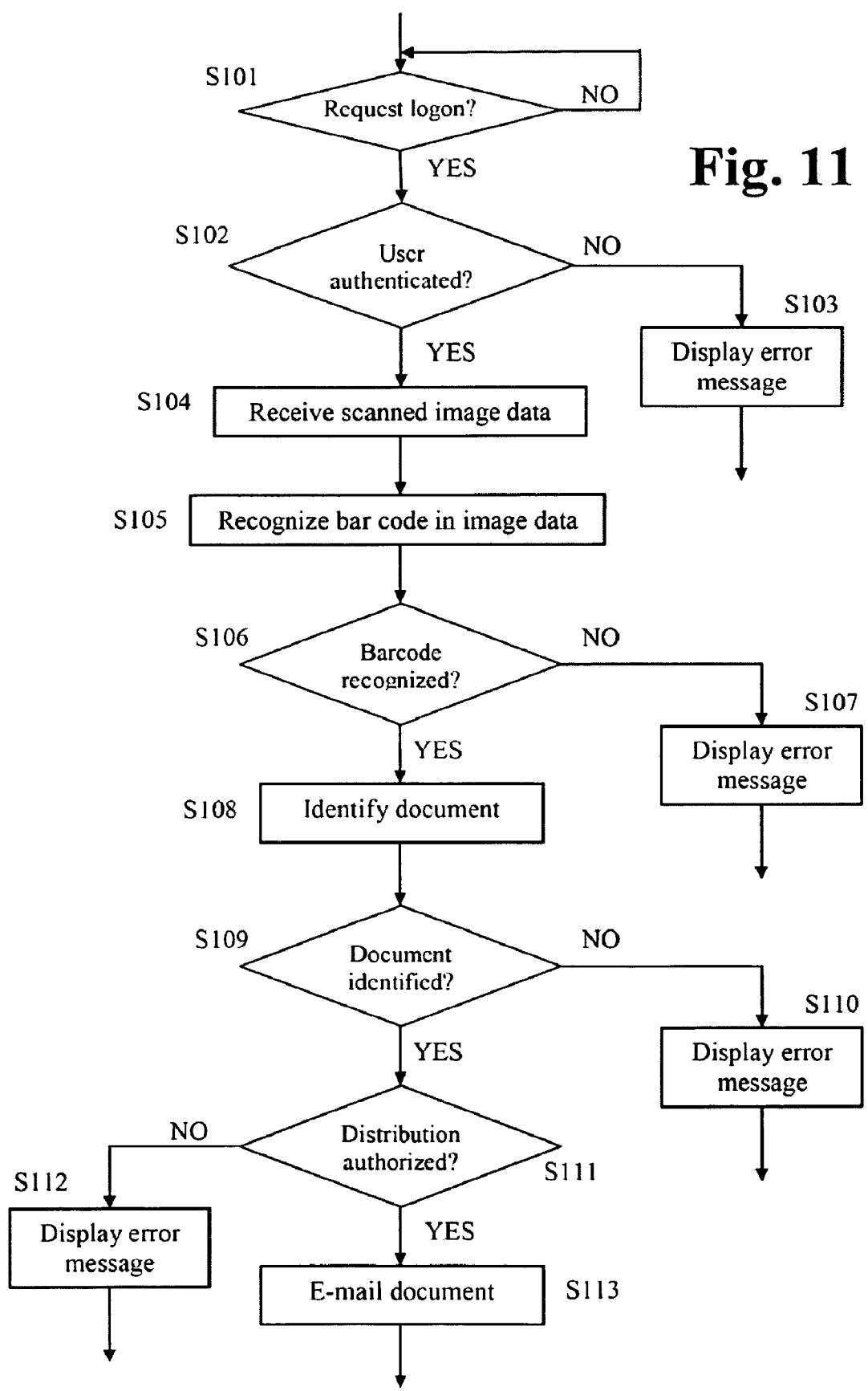
FIG. 11 shows a flow chart for a method for managing electronic data to be distributed, in an exemplary embodiment of the present disclosure.
Figure 16:
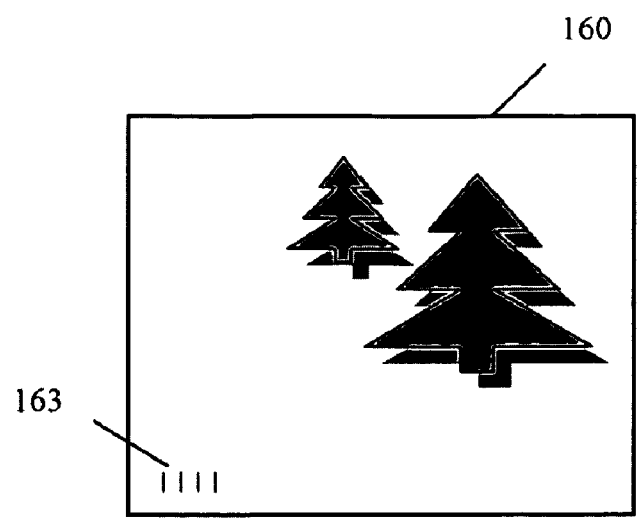
FIG. 16 shows an example of a visible image with an identification image added therein identifying a corresponding document.

As another aspect of the example of FIG. 11, the user can access (assuming the user is authorized) the attachment once the document has been scanned and the system recognizes the barcode thereon and identifies the document. In such approach, the document may be, for example, a still image photograph (such as shown in FIG. 16, for example) which the user is happy to have, but would also like to access associated content, such as a video that is identified in the information management table as an attachment to the photograph. Since the barcode was added to the still image photograph, the photograph can be readily and automatically identified, and the information associated with the photograph and stored in the information management table can be retrieved. Accordingly, the user possessing such still image photograph can access a slew of electronic data associated with the document.

Likewise, once the system recognizes a barcode in the image data and identifies the document, the URL associated with the document can be retrieved and can be utilized to retrieve the source file of the document. Thus, the user can download the source file and, utilizing appropriate application software, modify the document.

Figure 17:
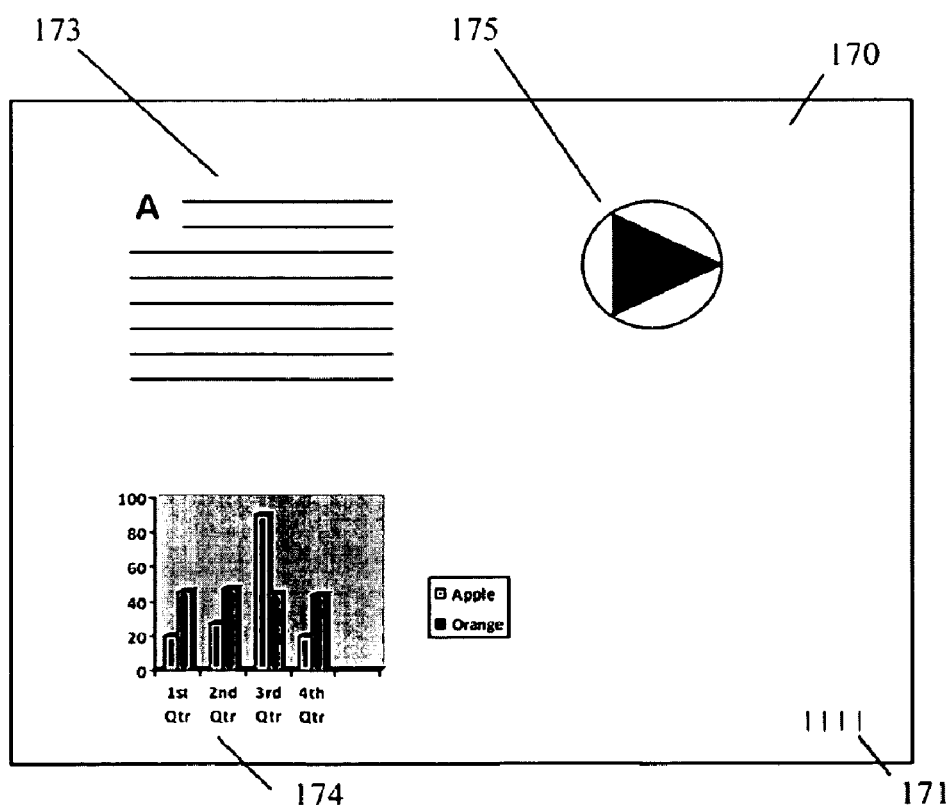
FIG. 17 shows an example of output of a visible image corresponding to a document and including graphical representations corresponding to attachments or other available content.

In another example, the hardcopy may simply be a collection of images or graphics representing respective content, plus in addition a bar code. Thus, the user can recognize from the hardcopy the content generally associated with the hardcopy and available for access. FIG. 17 shows such a graphical summary 170 of the content associated with barcode 171, including graphical element 173 indicating associated textual content (for example, a Word file), graphical element 174 indicating associated graphical presentation (for example PowerPoint file) or other content (for example an Excel file), and graphical element 175 indicating associated video, audio and/or multi-media content.

Another exemplary embodiment of this disclosure in which the content to be saved is not a document per se but other content (such as movie, photograph, etc.) will now be described.

In a method for managing electronic data to be saved, in such other exemplary embodiment (FIG. 18), a photo or movie file is uploaded from an external source (step S181), such as a digital video recorder or camera, a network connection, etc. For example, the user may have edited the file using a photo or video editor application.

The user specifies a file (for example, image data file or another file) to be printed from the database, and URLs to any attachments to be associated with the content are saved in the information management table (step S183). A destination to save the file in the database is selected (step S185). The server automatically creates a unique identification for the file, uses the identification in creating a URL for the file, and updates the information management table 48 to reflect the file name, identification and URL of the file (step S187). The user specifies destination e-mail addresses to which the file (or URL thereof) and attachments can be transmitted (step S189).

Figure 18:
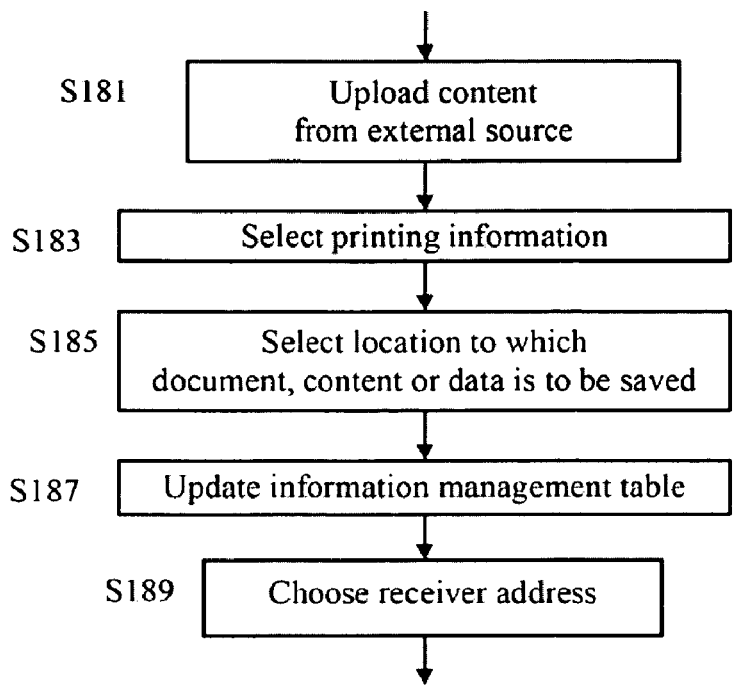
FIG. 18 shows a flow chart for a method for managing electronic data to be saved, in another exemplary embodiment of the present disclosure.

In the exemplary embodiment of FIG. 18, the information management table is used in a similar manner as the previous embodiments. However, when a user requests print in association with the file, if the file is a movie, the movie file of course is not printed, but rather another file specified by the user in step S183 is printed and a barcode corresponding to the identification assigned to the movie file is added to the printout. The same user or another user with such printout can later scan the bar code to access the movie as well as any attachments. Likewise, the user can e-mail the URL of the file to a destination, and the destination end can requests access to the movie file and/or attachments.

Such capabilities allow the user who uploaded and saved the content in the database to control access to the uploaded content without being bothered when the other person requests access.

Figure 19:
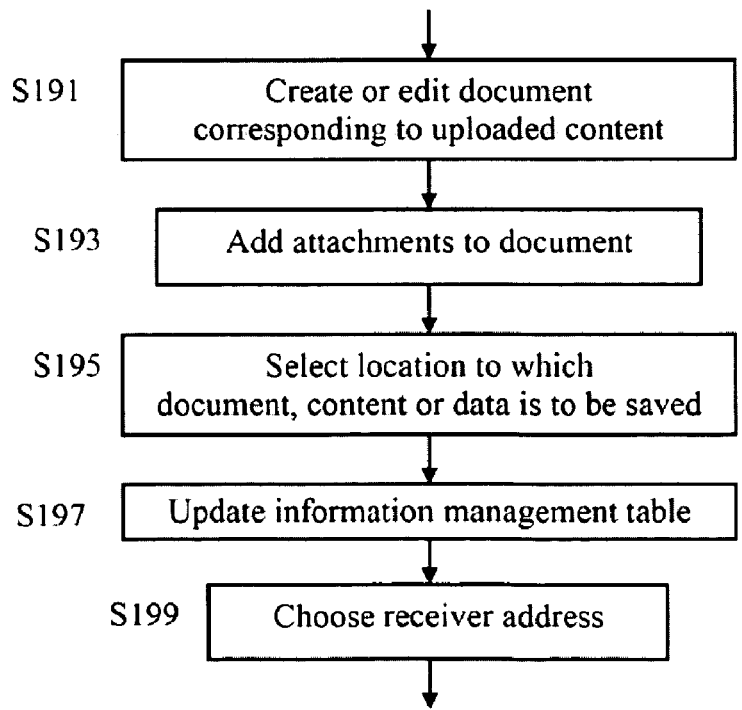
FIG. 19 shows a flow chart for a method for managing electronic data to be saved, in another exemplary embodiment of the present disclosure.

In another exemplary embodiment (FIG. 19), when the user generates or modifies a file to be saved (step S191), the user adds images of attachments to the file (step S193). Steps S195, S197 and S199 in FIG. 19 are similar to steps S185, S187 and S189 in FIG. 18.

When the file is printed, the hardcopy includes the images representing the attachments, plus in addition a bar code. Thus, the user can recognize from the hardcopy the attachments available for access. FIG. 17 shows such a graphical summary 170 of the content associated with barcode 171, including graphical element 173 indicating associated textual content (for example, a Word file), graphical element 174 indicating associated graphical presentation (for example Powerpoint file) or other content (for example an Excel file), and graphical element 175 indicating associated video, audio and/or multi-media content.

Figure 20:
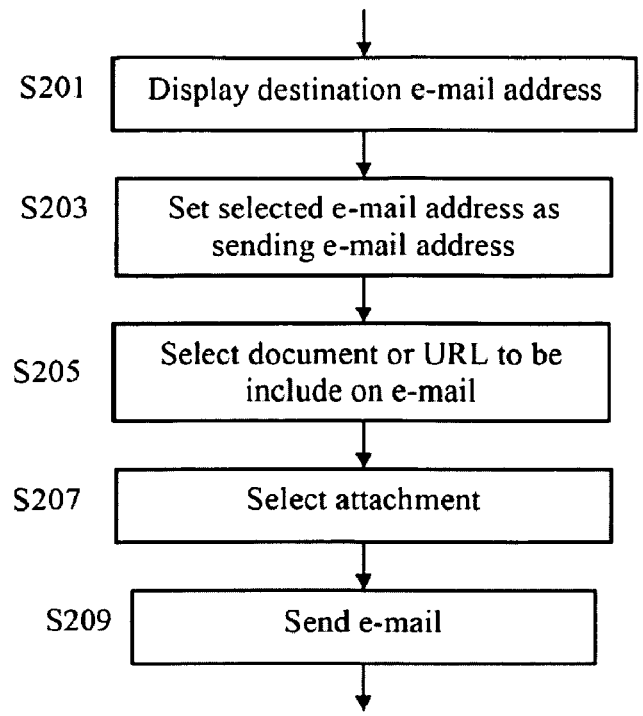
FIG. 20 shows a flow chart for a method for managing electronic data to be distributed, in another exemplary embodiment of the present disclosure.
Figure 21:
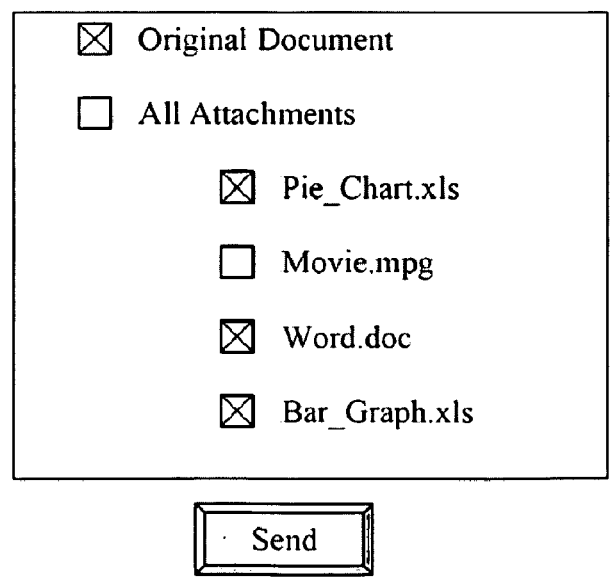
FIG. 21 shows an example of a user interface for selecting electronic data to be distributed.

A method for managing electronic data to be distributed, in another example when the file has multiple attachments, will now be described with reference to FIGS. 20 and 21.

As with other exemplary embodiments described above, a list of candidate destinations are preferably displayed (step S201), in order to facilitate selection of destinations. The user can select one or more of the candidate destinations and the e-mail is transmitted to the user-selected destinations (step S203).

In addition, the user is prompted to select the content to be transmitted, including selecting whether the original document is to transmitted or a URL thereof (step S205) and selecting all or any attachments to be include in the e-mail (step S207). An example of a user interface that can be presented for the user to select the content to be transmitted is shown in FIG. 21. However, such user interface can be modified to reflect one or more features of the user interfaces shown in FIGS. 15a and 15b.

The e-mail is sent upon the user pressing the Send button (step S209), in accordance with the settings applied in steps S203, S205 and S207.

The above-mentioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A system for managing electronic data, comprising:
an identification data storage unit storing (i) identification data identifying specific electronic data stored in data storage, (ii) associated information identifying one or more associated data files associated with the specific electronic data, and (iii) distribution authorization information identifying users having authorization to distribute the one or more associated data files;
a user authentication data storage unit storing user authentication information for identifying and authenticating users;
an output unit configured to output a visible image corresponding to the specific electronic data, and add to the visible image an identification image based on the identification data identifying the specific electronic data;
an identification recognition unit configured to detect the identification image in the visible image, recognize the identification data from the detected identification image, and determine said one or more associated data files associated with the specific electronic data, based on the associated information; and a data sending unit configured to send said one or more associated data files associated with the specific electronic data and corresponding to the recognized identification data to one or more of authorized destinations specified by a user, after the user is authenticated based on the user authentication information and is determined based on the distribution authorization information to be authorized to send the one or more associated data files.

2. The system of claim 1, wherein said one or more associated data files associated with the specific electronic data identified by said identification data includes video data, and said visible image includes a still image corresponding to a part of the video data.

3. The system of claim 2, wherein the one or more associated data files associated with the specific electronic data and sent by said data sending unit to the specified destination includes the video data corresponding to the recognized identification data.

4. The system of claim 2, wherein said one or more associated data files associated with the specific electronic data and sent to the specified destination includes a uniform resource locator (URL) indicating a location of the video data.

5. The system of claim 1, wherein said specific electronic data identified by said identification data includes image data from a scanner device.

6. The system of claim 1, wherein said identification data storage unit storing said identification data stores in addition, receiver address information identifying destinations to which the specific electronic data identified by said identification data is authorized to be sent.

7. The system of claim 1, wherein said identification data storage unit storing said identification data stores in addition, an indication of data type of the specific electronic data identified by the identification data.

8. The system of claim 1, wherein said identification data storage unit storing said identification data is distinct from said data storage storing said specific electronic data identified by the identification data.

9. An apparatus for managing and/or sending electronic data, comprising:

an identification recognition unit configured to detect an identification image in a visible image corresponding to specific electronic data stored in data storage, and recognize from the identification image identification data identifying the specific electronic data corresponding to the visible image;

a data retrieving unit configured to obtain, from data storage, one or more associated data files associated with the specific electronic data corresponding to the recognized identification data;

a data sending unit configured to send the one or more associated data files associated with the specific electronic data to one or more of authorized destinations specified by a user, after the user is authenticated based on user authentication information and is determined based on distribution authorization information to be authorized to send the one or more associated data files; and a user interface, wherein an information management database storing said identification data stores in addition, receiver address information identifying destinations to which the specific electronic data identified by said identification data is authorized to be sent, and said user interface presents as destination stored in said information management database.

10. The apparatus of claim 9, wherein said data sending unit sends, to the specified destination, a uniform resource locator (URL) indicating a location of the said one or more associated data files associated with the specific electronic data identified by the identification data.

11. The apparatus of claim 9, wherein said data sending unit sends, to the specified destination, said one or more associated data files and a uniform resource locator (URL) indicating a location of the specific electronic data identified by the identification data.

12. The apparatus of claim 11, wherein said one or more associated data files sent to the specified destination does not include confidential information, and the specific electronic data includes confidential information.

13. The apparatus of claim 9, wherein said associated data files associated with the specific electronic data identified by said identification data includes video data, and said visible image includes a still image corresponding to a part of the video data.

14. A method for managing electronic data, comprising:
storing specific electronic data in data storage;
storing (i) identification data corresponding to the specific electronic data to identify the specific electronic data, (ii) associated information identifying one or more associated data files associated with the specific electronic data, and (iii) distribution authorization information identifying users having authorization to distribute the one or more associated data files;
storing user authentication information in a user management table;
outputting a visible image corresponding to the specific electronic data, and adding to the visible image an identification image based on the identification data identifying the specific electronic data;
authenticating a user by comparing user supplied information with the user authentication information in the user management table;
detecting the identification image in the visible image, recognizing the identification data from the detected identification image, and determining said one or more associated data files associated with the specific electronic data, based on the associated information; and
sending the one or more associated data files associated with the specific electronic data and corresponding to the recognized identification data to one or more authorized destinations specified by a user, after the user is authenticated based on the user authentication information and is determined based on the distribution authorization information to be authorized to send the one or more associated data files.

15. The method of claim 14, further comprising sending, to the specified destination, the specific electronic data identified by said identification data, if the specific electronic data does not include confidential information.

16. The method of claim 14, further comprising sending, to the specified destination, a uniform resource locator (URL) indicating a location of the specific electronic data identified by the identification data, if the specific electronic data includes confidential information.

17. The system of claim 1, wherein said one or more associated data files associated with the specific electronic data include related electronic data attachments related to the specific electronic data.

* * * * *